United States Patent Office 3,375,297
Patented Mar. 26, 1968

3,375,297
MIXTURES OF POLYHYDROXYETHERS AND POLYARYLENE POLYETHERS
Bruce P. Barth, Somerville, Thomas E. Bugel, New Market, and Warren F. Hale, Somerville, N.J., assignors to Union Carbide Corporation, a corporation of New York
No Drawing. Filed May 27, 1965, Ser. No. 459,454
17 Claims. (Cl. 260—823)

This invention relates to mixture of thermoplastic polyhydroxyethers and thermoplastic polyarylene polyethers, and in particular to such mixtures characterized by improved thermal stability, improved resistance to thermal stress embrittlement, and excellent adhesion. More particularly, this invention relates to structural elements comprising such mixtures and an adherend.

Polyhydroxyethers are substantially linear thermoplastic polymers that combine the application and handling characteristics of a thermoplastic with most of the outstanding physical and chemical properties of a thermosetting resin. The excellent mechanical and physical properties of these polymers render them useful for a wide variety of end use applications. In particular, these polymers have been found to have exceptional adhesive characteristics. They will form a strong adhesive bond with virtually any wettable surface of any configuration. As such, these polymers are especially attractive for coating, laminating, and matrix applications. However, it has been found that the thermal and dimensional stability at elevated temperatures of polyhydroxyethers is poor and prevents their use in applications where resistance to elevated temperatures is a primary requisite. More and more, new applications that open up to thermoplastic materials require a resistance to thermal and dimensional changes at elevated temperatures.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and non-dripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers while possessing superior thermal properties, undergo undesirable thermal stress embrittlement. That is, load bearing or stressed articles molded from polyarylene polyethers will crack and craze when exposed to the same elevated temperatures that an unstressed article would otherwise withstand.

Unexpectedly, it has now been discovered that polyhydroxyethers are rendered thermally stable and that polyarylene polyethers are rendered more resistant to thermal stress embrittlement by admixing from about 1 to about 99 parts by weight of thermoplastic polyhydroxyether with from about 99 to about 1 part by weight of thermoplastic polyarylene polyether. In addition, the mixture exhibits excellent adhesive characteristics. Of note is the fact that the incorporation of one polymer in the other does not adversely affect the desirable properties of either polymer. The polyhydroxyethers and polyarylene polyethers used in this invention are described herein.

Thermoplastic polyarylene polyethers used in the present invention are linear thermoplastic polymers having a basic structure composed of recurring units having the formula

—O-E-O-E'— wherein E is the residuum of the dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy, and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenol)propane, 1,1 - bis - (4 - hydroxyphenol)-2-phenylethane, bis - (4 - hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2 - bis - (4-hydroxyphenyl)propane, 2,4'-dihydroxydiphenylmethane, bis - (2-hydroxyphenyl)methane, bis - (4 - hydroxyphenyl) - methane, bis-(4-hydroxy-2,6-dimethyl - 3 - methoxyphenyl)-methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis - (3-isopropyl-4-hydroxyphenyl)propane, 2,2-bis-(2-isopropyl - 4 - hydroxyphenyl)propane, 2,2 - bis - (4-hydroxynaphthyl)propane, 2,2-bis-(4-hydroxyphenyl)pentane, 3,-3-bis-(4-hydroxyphenyl)pentane, 2,2-bis-(4-hydroxyphenyl)heptane, bis-(4 - hydroxyphenyl)phenylmethane, 2,2-bis-4-hydroxyphenyl) - 1 - phenylpropane, 2,2-bis-(4-hydroxyphenyl)-1,1,1,3,3,3-hexafluoropropane and the like;

Di(hydroxphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)ether, the 4,3'-, 4,2'- 2,2'-, 2,3'-dihydroxydiphenyl ethers, 4,4'-dihydroxy-2,6-dimethyldiphenyl ether, bis-(4-hydroxy-3-isobutylphenyl)ether, bis - (4-hydroxy-3-isopropylphenyl)ether, bis-(4-hydroxy - 3 - chlorophenyl)-ether, bis-(4-hydroxy - 3 - fluorophenyl)ether, bis-(4-hydroxy-3-bromophenyl)ether, bis - (4-hydroxynaphthyl)-ether, bis-(4-hydroxy-3-chloronaphthyl)ether, 4,4'-dihydroxy-3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

An electron withdrawing group can be employed as the activator group in the dihalobenzenoid compounds. Preferred are the strong activating groups such as the sulfone group (—SO₂—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951), and Quart. Rev., 12, 1 (1958).

The electron withdrawing group of the dihalobenzanoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent groups which can activate displacement of halogens on two different rings, such as the sulfone group —SO₂—; the carbonyl group —CO—; the vinyl group —CH=CH—; the sulfoxide group —SO—; the azo-group —N=N—; the saturated fluorocarbon groups —CF₂—CF₂; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

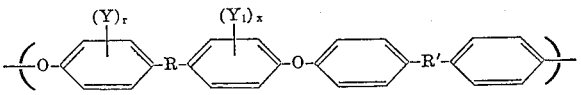

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y₁ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical

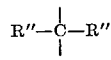

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula R—S(O)$_z$—R wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for the polymer during polymerization. Chlorobenzene, dichlorobenzene, and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C. are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

Polyhydroxyethers used in this invention are linear thermoplastic polymers having the general formula

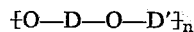

wherein D is the residuum of a dihydric phenol, D' is a hydroxyl containing residuum of an epoxide, and $n$ represents the degree of polymerization and is at least 30 and is preferably 80 or more. Polyhydroxyethers having a melt flow of less than about 7.0 determined as hereinafter described are preferred.

The residuum D of the dihydric phenol in the polyhydroxyether formula is the same as the dihydric phenol residuum E in the polyarylene polyether recurring unit formula described above.

The epoxide contributing the hydroxyl containing residuum D' can be a monoepoxide or diepoxide. By "epoxide" is meant a compound containing an oxirane group, i.e., oxygen bonded to two vicinal aliphatic carbon atoms, thus,

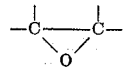

A monoepoxide contains one such oxirane group and provides a residuum D' containing a single hydroxyl group; a diepoxide contains two such oxirane groups and provides a residuum D' containing two hydroxyl groups. Saturated epoxides, by which term is meant diepoxides free of ethylenic unsaturated i.e. —C=C— and acetylenic unsaturation i.e., —C≡C—, are preferred. Particularly preferred are halogen substituted saturated monoepoxides, i.e., the epihalohydrin and saturated diepoxides which contain solely carbon, hydrogen and oxygen, especially those wherein the vicinal or adjacent carbon atoms form part of an aliphatic hydrocarbon chain. The oxygen in such diepoxides can be, in addition to oxirane oxygen, ether oxygen —O—, oxocarbonyl oxygen

carbonyl oxygen

and the like.

Specific examples of monoepoxides include epichlorohydrins such as epichlorohydrin, epibromohydrin, 1,2-epoxy-1-methyl-3-chloropropane, 1,2-epoxy-1-butyl-3- chloropropane, 1,2-epoxy-2-methyl-3-fluoropropane, and the like.

Illustrative diepoxides include diethylene glycol bis(3,4-epoxycyclohexane-carboxylate),
bis(3,4-epoxycyclohexylmethyl)adipate,
bis(3,4-epoxycyclohexylmethyl)phthalate,
6-methyl-3,4-epoxycyclohexylmethyl-6-methyl-3,4-epoxycyclohexanecarboxylate,
2-chloro-3,4-epoxycyclohexylmethyl-2-chloro-3,4-epoxycyclohexanecarboxylate,
diglycidyl ether, bis(2,3-epoxycyclopentyl)ether,
1,5-pentanediol bis(6-methyl-3,4-epoxycyclohexylmethyl)ether,
bis(2,3-epoxy-2-ethylhexyl)adipate,
diglycidyl maleate,
diglycidyl phthalate,
3-oxatetracyclo-[4.4.0.1$^{7,10}$.0$^{2,4}$]undec-8-yl 2,3-epoxypropyl ether,
bis(2,3-epoxycyclopentyl)sulfone,
bis(3,4-epoxyhexoxypropyl)sulfone,
2,2′-sulfonyldiethyl-bis(2,3-epoxycyclopentanecarboxylate),
3-oxatetracyclo[4.4.0.1$^{7,10}$.0$^{2,4}$]undec-8-yl 2,3-epoxybutyrate,
4-pentenal-di(6-methyl-3,4-epoxycyclohexylmethyl)acetal,
ethylene glycol bis(9,10-epoxystearate),
diglycidyl carbonate,
bis(2,3-epoxybutylphenyl)2-ethylhexyl phosphate,
diepoxydioxane,
butadiene dioxide and
2,3-dimethylbutadiene dioxide.

The preferred diepoxides are those wherein each of the oxirane groups is connected to an electron donating substituent which is not immediately connected to the carbon atoms of that oxirane group.

Such diepoxides have the grouping

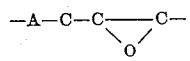

wherein A is an electron donating substituent such as —O—,

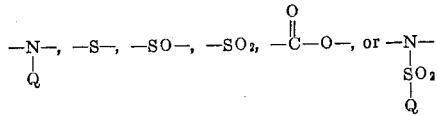

where Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhyydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether which, at a temperature of 220° C. and under a pressure of 44 p.s.i., flowed through an orifice having a diameter of 0.825″ and a length of 0.315″ over a ten minute period. Four such determinations were made and the average of the four determinations is reported as decigrams per minute under a pressure of 44 p.s.i. and at 220° C.

Thermoplastic polyhydroxyethers used in the present invention can be prepared as described in Example 2 infra.

The thermoplastic polyhydroxyethers used in this invention can be further modified by being reacted with a variety of crosslinking agents such as, among others organic isocyanates, e.g., toluene diisocyanates, dianisidine diisocyanates, polyethylene polyisocyanate, toluene diisocyanate terminated polybutylene glycol, and phenol blocked polyisocyanate and the like; methylol containing compounds, e.g., 2,4,6-trimethylolphenol, polymethylolated bisphenol sulfone, dimethylol-p-tert-butylphenol, dimethylol-p-methylphenol butylphenol-formaldehyde resin, nonylphenol formaldehyde resin, butylated melamine-formaldehyde resin and the like; epoxy compounds e.g., the diglycidyl ether of 2,2-bis(4-hydroxyphenyl)propane, 2,4 - epoxy - 6 - methylcyclohexylmethyl - 3,4 - epoxy - 6-methylcyclohexanecarboxylate and the like; aldehydes e.g., glyoxal, dialdehyde starch, formaldehyde copolymers and the like; formals e.g., dibutyl formal, di-(2-chloromethyl) formal and the like; dicarboxylic acid anhydrides, e.g., maleic anhydrides, phthalic anhydride and the like; acids e.g., glutaric acid, sebacic acid, isophthalic acid, phosphoric acid; chloroformates, e.g., diglycol chloroformate of 2,2-bis(4-hydroxyphenyl)propane and the like; silanes e.g., ethyltrichlorosilane, diphenyl dichlorosilane, tetraethyl ortho silicate and the like; metal organic salts e.g., tetrabutyl titanate, aluminum acetyl acetonate, zinc acetyl acetonate, zirconium acetyl acetonate and the like; ureas e.g., dimethyl ether of dimethylol urea; inorganic esters e.g., dimethyl sulfate; acyl chlorides, e.g., succinyl chlorides and the like; inorganic polychlorides, e.g., zinc chloride, aluminum trichloride and the like; esters, e.g., glycol diformate, glycol dipropionate triglycol di-(2-ethylhexanoate) and the like; as well as trichloroacetaldehyde glyoxalic acid, and epichlorohydrin and similar compounds having mixed functional groups.

Also useful in this invention are thermoplastic polyhydroxyethers modified without crosslinking by esterification with an acyl group obtained from any one of a variety of acylating agents containing but one secondary hydroxyl reactive group e.g., organic acids, inorganic acids and acid derivatives such as acid halides and anhydrides having the general formula

GZ wherein G is an inorganic or organic acid radical such as acetyl, benzoyl, stearyl, formyl, propionyl, chloroacetyl, o-chlorobenzyl, p - toluenesulfonyl, mercaptoacetyl, diphenylphosphinyl, nitrate and like groups and Z is (a) halogen, i.e., fluorine, chlorine, bromine, and iodine where the acylating agent is an acid halide; (b) a G′ group, G′ being a radical as listed above and free of any substituents reactive with secondary hydroxyl groups where the acylating agent is an acid anhydride; (c) a OH group where the acylating agent is an acid, either inorganic or organic; and a G″ group where G″ is any hydrocarbon group free of aliphatic unsaturation such as alkyl, cycloalkyl, aryl or aralkyl groups or a substituted hydrocarbon group free of substituents reactive with secondary hydroxyl groups where the acylating agent is an acid ester. Other acylating agents include hexachloro-2-cyclopentenone, soya fatty acids and tall oil acids.

Admixing the polymeric constituents can be accomplished in any manner as long as a thorough blending of the polyhydroxyether and polyarylene polyether is obtained. For example, admixing may be accomplished by a variety of methods normally employed for incorporation of plasticizers or fillers into thermoplastic materials including but not limited to mixing rolls, doughmixers, Banbury mixers, extruders, and other mixing equipment. The resulting polymeric mixtures may be handled in any conventional manner employed for the fabrication or manipulation of thermoplastic polymers. The mixtures can be molded using compression, injection, calendering and extrusion techniques. Alternatively, the admixing may be accomplished by mixing solutions of the two polymers which may thereafter be treated with a non-solvent to effect coprecipitation. The precipitated mixture may then be recovered in a dry state after filtration to remove the non-solvent and final evaporation of residual solvent. Dry blending a mixture of the individual polymers followed by thermal fusion is a convenient means for producing a conventional molding compound. In this procedure the dry blend may be extruded and chopped into pellets for subsequent use in injection molding procedures.

The polyhydroxyether-polyarylene polyether mixtures of this invention may contain other additives to plasticize, extend, lubricate, prevent oxidation or lend color the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed with various fillers to make molded parts and articles such as gears, ratchets, bearings, cams, impact parts, gaskets, valve seats, bottles, containers and the like. They can be used to prepare molded, calendered or extruded articles, films, coatings, threads, filaments, tapes, and the like. They can be applied to a broad spectrum of uses in form of sheets, rods, tapes and the like and are useful in electrical applications.

Because of the excellent adhesive characteristics of the polyhydroxyether-polyarylene polyether mixtures of this invention, they can be advantageously employed in one or more decorative, protective, structural or bonding capacities to provide structural elements comprising an adherent and an adherent mixture of polyhydroxyether and polyarylene polyether as described herein.

The terms "structural element" and "structural elements" as used herein refer to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherent, such as a substrate and an adhering layer of polymeric mixture as in a two-ply laminate or a coated substrate; structural elements comprising an interlayer of polymeric mixture sandwiched between and adhered to two similar or dissimilar adherents or laminae as in a plural ply laminate; structural elements comprising a polymeric mixture matrix surrounding and adhered to as a bond and/or a support for variously shaped and sized adherends, for example as articles of varying porosities, for example as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass, and wood and is absent in polyethylene or because of surface treatment or cleanliness or for any other reason.

Adherends having a tangible surface or surfaces, preferably a tangible wettable surface or surfaces, to which polyhydroxyether-polyarylene polyether mixtures readily adhere include metals, polar materials, vitreous materials, proteinaceous materials, cutaneous materials, cellulosic materials, natural resins, synthetic organic polymeric material, nonmetallic materials, and the like. Adherends can be particulate, granular, fibrous, filamentary, ropy, woven, nonwoven, porous, nonporous, rigid, and nonrigid.

Metallic adherends include elementary metals such as aluminum, chromium, cobalt, copper, gold, iron, lead, magnesium, nickel, platinum, silver, tin, titanium, tungsten, vanadium, zinc, and the like, and alloys such as alloy steel, alnico, brass, bronze, carbon, steel, cast iron, chromium steel, nichrome, pewter, solder, stainless steel, sterling silver, and the like. Metallic adherends can be powdered, granular, or in the form of leaf, foil, sheet, bar, rod, and the like.

Polyhydroxyether-polyarylene polyether mixtures are used to fasten metal articles such as letters and numerals to metallic or ceramic or like substrates, to bond propellers to drive shafts, to fix handles onto metal, especially iron and aluminum pots, and metal doors, to bond bearing surfaces to a strong substrate, to bond a "veneer" of costly metals to less expensive metallic substrates for use as a chemical reactor, and to bond dissimilar metals to form a thermocouple or similar bimetallic element. Laminates of polymeric mixtures and metal foil or sheet can be cold formed into a variety of useful structural elements such as gutters, downspouts, ductwork and the like.

Vitreous adherends include glass, glassware, ceramics, clays, enameled materials, china, porcelain and the like. Cellulosic adherends include wood, plywood, sawdust, cane, bamboo, rattan, paper, and the like.

Natural resin adherends include asphalt, bitumen, gums, lacquer, pitch, rosin, rubber, shellac, tar, varnish and the like. Synthetic organic polymeric adherends include thermosetting polymers such as phenolaldehyde type polymers, coumarone indene polymers, phenolurea polymers, epoxy resins and the like, and thermoplastic polymers such as polyolefins, polystyrenes, polycarbonates, polyformaldehydes, polyvinyls, synthetic rubber such as neoprene and the like, nylon and the like.

Among nonmetallic adherends can be mentioned dyes such as aniline dyes, azo dyes, mordant dyes, and the like, pigments such as aniline black, bone black, ink black, ash, iron grey, cadmium yellow, and the like, minerals such as bauxite, carbon, clay, coal, coke, graphite, gypsum, lime, mica, peat, silica, talc, vermiculite, and the like, rock, stone and gravel such as chalk, lava, limestone, marble, quartz, shale, slate, and the llke, building materials such as brick, plaster, tile, wallboard, cement, and the like, fabrics such as broadcloth, burlap, canvas, cotton, Dacron, denim, felt, glass fiber cloth, gunny, linen, nylon, Orlon, rayon, silk, wool, and the like, fibers and filaments such as flax, glass, hemp, jute, manila, aakum, raffia, sisal, and the like, cords such as gut, rope, twine, whipcord, and the like, pelts, furs, hides, leathers and the like.

Adherent polyhydroxyether-polyarylene polyether mixtures are used to bond glass fibers, woven and non-woven glass fiber cloth, glass fiber mats and bats, into laminated articles having utility as an automotive or building structural elements, into prepreg, post formable laminates which can be formed into useful articles such as automobile fenders and the like, and into filament wound structures such as pipe and high pressure tanks.

In general, it can be stated that what is required to adhere a polyhydroxyether-polyarylene polyether mixture to an adherend is to flux the mixture at the interface of the two materials. Fluxing is flow under heat and usually pressure, and is easily accomplished by the input of sufficient heat into the area to be bonded. Fluxing can best be accomplished by heating either the substrate and pressing the mixture thereagainst or heating the mixture in some manner, e.g. radiant heating, convection, induction, electrically, ultrasonically, et cetera, and pressing the adherend against the mixture or a heated particulate adherend can be blown against the mixture. It is to be emphasized that actual flow is not necessary, because the polyhydroxyether-polyarylene polyether mixtures can be "activated" into bonding without flow, as occurs, for example, in some solution coatings. Generally, a short bake at moderate temperatures will improve the bond obtained from solution coatings. The use of pressure assists in obtaining good bonding. Typical of amorphous thermoplastics, polyhydroxyether-polyarylene polyether mixtures have no distinct melting point or narrow melting range but rather soften over a wide temperature range. At the lower end of the softening range, heat alone may not be sufficient to flux the mixture as it is at the high end of the range, but a combination of mild heat and pressure will cause the mixture to flow.

It is preferred in this invention to fabricate the structural elements comprising a polyhydroxyether-polyarylene polyether mixture and the adherend at the highest temperature consistent with maintaining the integrity of the polyhydroxyether-polyarylene polyether mixture and the substrate.

Polyhydroxyether-polyarylene polyether mixtures can be applied to adherends from solution as by spraying, dipping, brush flow coating, impregnation and the like; by melt application as in extrusion coating, powder coating, flame spraying and fluid bed coating and the like; and, importantly, by film laminating.

The following examples are intended to further illustrate the present invention without limiting the same in any manner. Parts and percentages given are by weight unless indicated otherwise.

In the examples, the following test procedures were used to obtain data:

| | |
|---|---|
| Tensile properties | ASTM D–368–60T |
| Flexural properties | ASTM D–790–59T |
| Lap shear strength | ASTM D–1002 |
| Heat distortion temperature | ASTM D–1637–59T |
| Melt flow | ASTM D–1237–57T |

Glass transition temperature (Tg), commonly referred to as the second order phase transition temperatures, refers to the inflection temperatures found by plotting the resilience (recovery from 1 percent elongation) of a film ranging in thickness from 3–15 mils against the temperature. A detailed explanation for determining resilience and inflection temperature is given by Brown, Textile Research Journal, 25, 891 (1955).

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

EXAMPLE 1

*Preparation of thermoplastic polyarylene polyether*

In a 250 ml. flask equipped with a stirrer, thermometer, a water cooled condenser and a Dean Stark moisture trap filled with benzene, there were placed 11.42 grams of 2,2-bis(4-hydoxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture was cooled and 14.3 grams (0.05) of 4,4'-dichlorodiphenylsulfone was added followed by 40 ml. of anhydrous dimethylsulfoxide, all under nitrogen pressure. The mixture was heated to 130° C. and held at 130–140° C. with good stirring for 4–5 hours. The viscous, orange solution was poured into 300 ml. water, rapidly circulating in a Waring Blendor, and the finely divided white polymer was filtered and then dried in a vacuum over at 100° C. for 16 hours. The yield was 22.2 g. (100%) and the reaction was 99% complete based on a titration for residual base.

The polymer had the basic structure

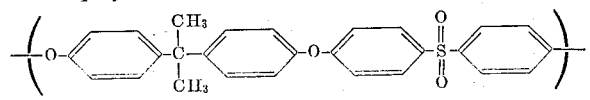

EXAMPLE 2

*Preparation of thermoplastic polyhydroxyether*

Thermoplastic polyhydroxyether was prepared by the reaction of equimolar amounts of 2,2-bis(4-hydroxyphenyl)propane and epichlorohydrin together with sodium hydroxide. Equipment used was provided with a sealed stirrer, thermometer, and reflux condenser. There was placed therein:

| | Parts |
|---|---|
| 2,2-bis(4-hydroxyphenyl)propane (0.5 mole) | 114.5 |
| Epichlorohydrin (99.1%) pure (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessel were heated at 80° C. (reflux) for 2½ hours. Upon cooling, the reaction mixture was cut with 200 parts of the 7:3 toluene:butanol mixture. One hundred parts of water was added and agitated with the contents to dissolve salts present in the reaction mixture. The vessel contents were allowed to settle for ten minutes during which time a lower brine phase formed. This phase was separated by decantation. The upper polymer containing solution phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered, and dried. There was obtained a thermoplastic polyhydroxyether of 2,2-bis(4-hydroxyphenol)propane and epichlorohydrin having a melt flow of 7.0 decigrams per minute.

EXAMPLES 3–6

In these examples, polymer admixing was accomplished by one of the following three methods.

(A) *Solution blending.*—A mixture of polyhydroxyether prepared as in Example 2 and having a melt flow of 0.8 and polyarylene polyether prepared as in Example 1 and having an RV of 0.68 was dissolved in chloroform. The solution was pressure-filtered to remove any insolubles and the filtrate coagulated in excess isopropanol in a Waring Blendor. After the polymer mass had been chopped twice with fresh isopropanol in the blender, the sample was vacuum dried at 55° C. for 16 hours. A 5–6 mil film was pressed at 180° C. and 15,000 p.s.i.

(B) *Two-roll mill blending.*—A three inch by eight inch, oil-heated two-roll mill was preheated to 240° C. and polyarylene polyether prepared as in Example 1 and having a RV of 0.46 was fluxed on the rolls. Polyhydroxyether prepared as in Example 2 and having a melt flow of 0.8 was added and the mixture was milled for 20 minutes, removed, and cooled. A 5–6 mil film was pressed at 210° C. and 15,000 p.s.i.

(C) *Extrusion blending.*—A mixture of polyarylene polyether prepared as in Example 1 and having a RV of 0.40 and polyhydroxyether prepared as in Example 2 and having a melt flow of 2.0 was mechanically rotated in a fiber-pak. The mixed pellets were vacuum dried at 60° C. overnight and then extruded through a one inch melt extruder at 293° C. The chopped strand was redried at 60° C. under vacuum and extruded again under the same conditions. A 5-6 mil film was pressed at 200° C. and 15,000 p.s.i.

Films of the mixtures thus prepared were tested for retention of tensile modulus at elevated temperatures. Results are summarized below.

| Example No. | Blending Method | Percent Polyarylene Polyether | $T_4$, °C.[1] | $T_3$, °C.[2] |
|---|---|---|---|---|
| 3 | A | 30 | 120 | 180 |
| 4 | B | 30 | 110 | 125 |
| 5 | B | 50 | 160 | 182 |
| 6 | C | 30 | 115 | 150 |
| Control I | | 0 | 95 | 100 |

[1] Temperature at which tensile modulus is 10,000 p.s.i.
[2] Temperature at which tensile modulus is 1,000 p.s.i.—will not support its own weight.

These examples demonstrate that the incorporation of a polyarylene polyether greatly improves the thermal stability of a polyhydroxyether. The data from these examples indicate that mixtures of this invention retain their tensile properties at temperatures as high as 182° C. (Example 5) whereas unmodified polyhydroxyether (Control I) shows a drop-off in properties at temperatures of 100° C. In addition, it was found that the room temperature mechanical properties of the mixtures of these examples were substantially the same as unmodified polyhydroxyether.

EXAMPLE 7

Small cups were injection molded from the polymeric mixtures of Example 6 and Control I. A Van Dorn injection molding machine was utilized at the following conditions: front cylinder at 500° F., rear cylinder at 480° F., 50 second molding cycle at 13,500–15,000 lbs. pressure. The mixtures were dried at 60° C. for 48 hours before molding. The cups were then subjected to elevated temperatures and tested visually for retention of dimensions. In one test the cups were immersed in boiling water for one hour. The control cup, after one hour in boiling water, was completely distorted whereas the cup from the mixture of Example 6 was unchanged. In another test, the cups were placed upside-down in an air-circulating oven. The temperature in the oven was then increased slowly from 100° C. to 150° C. over a period of 3½ hours. The control cup began to distort at 102° C., at 122° C. it was completely distorted, and at 150° C. it was reduced to a shapeless mass. However, the cup from the mixture of Example 6 was unchanged throughout the entire test.

EXAMPLE 8

Thermoplastic polyarylene polyether composed of recurring units having the formula

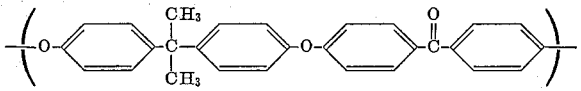

was prepared from 2,2'-bis-(4-hydroxyphenyl)propane and 4,4'-difluorobenzophenone according to the procedure of Example 1. This polymer was substituted for the polyarylene polyether in the mixture of Example 4. $T_4$ of a film pressed from the mixture was 100° C. and $T_3$ was 120° C. as compared to 95° C. and 100° C. for Control I.

EXAMPLE 9

Thermoplastic polyarylene polyether composed of recurring units having the formula

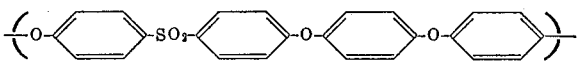

was prepared from 4,4'-dihydroxydiphenylether and 4,4'-dichlorodiphenylsulfone according to the procedure of Example 1. This polymer was substituted for the polyarylene polyether in the mixture of Example 4. $T_4$ of a film pressed from the mixture was 115° C. and $T_3$ was 150° C. as compared to 95° C. and 100° C. for Control I.

EXAMPLE 10

Thermoplastic polyarylene polyether composed of recurring units having the formula

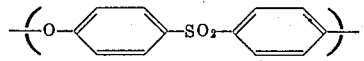

is prepared from 4,4'-dihydroxydiphenylsulfone and 4,4'-dichlorodiphenylsulfone according to the procedure of Example 1. A mixture comprising 5% by weight of this polymer and 95% by weight of polyhydroxyether prepared according to the procedure of Example 2 is prepared according to blending method B. The $T_4$ and $T_3$ of films pressed from the mixture indicate an improvement in the retention of tensile modulus at elevated temperatures as compared to Control I.

EXAMPLE 11

Thermoplastic polyarylene polyether composed of recurring units having the formula

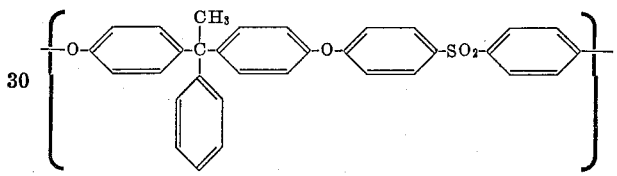

is prepared from the bisphenol of acetophenone and 4,4'-dichlorodiphenylsulfone according to the procedure of Example 1. A mixture comprising 15% by weight of this polymer and 85% by weight of polyhydroxyether prepared according to the procedure of Example 2 is prepared according to blending method A. The $T_4$ and $T_3$ of films pressed from the mixture indicate an improvement in the retention of tensile modulus at elevated temperatures as compared to Control I.

EXAMPLE 12

Thermoplastic polyarylene polyether composed of recurring units having the formula

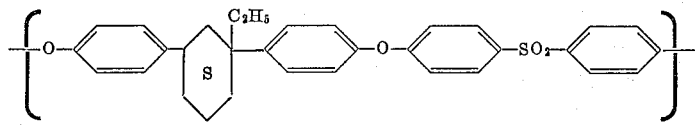

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure of Example 1. A mixture comprising 10% by weight of this polymer and 90% by weight of polyhydroxyether prepared according to the procedure of Example 2 is prepared according to blending method C. The $T_4$ and $T_3$ of films pressed from the mixture indicate an improvement in the retention of tensile modulus at elevated temperatures as compared to Control I.

EXAMPLE 13

Thermoplastic polyarylene polyether composed of recurring units having the formula

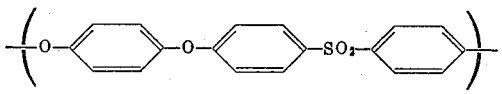

is prepared from hydroquinone and 4,4'-dichlorodiphenylsulfone according to the procedure of Example 1. A mixture comprising 25% by weight of this polymer and 75% by weight polyhydroxyether prepared according to the procedure of Example 2 is prepared according to blending method A. The $T_4$ and $T_3$ of films pressed from the mixture indicate an improvement in the retention of tensile modulus at elevated temperatures as compared to Control I.

EXAMPLE 14

Thermoplastic polyarylene polyether composed of recurring units having the formula

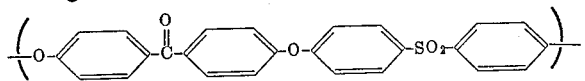

is prepared from 4,4'-dihydroxybenzophenone and 4,4'-dichlorodiphenylsulfone according to the procedure of Example 1. A mixture comprising 40% by weight of this polymer and 60% by weight of polyhydroxyether prepared according to the procedure of Example 2 is prepared according to blending method C. The $T_4$ and $T_3$ of films pressed from the mixture indicate an improvement in the retention of tensile modulus at elevated temperatures as compared to Control I.

EXAMPLES 15–16

Polymeric mixtures as prepared in Examples 5 and 6, and the polyhydroxyether of Control I, all in dry form, were each distributed between several plies of glass fiber swirl mat in amount sufficient to yield a laminate containing 50% glass mat and 50% polymer. Impregnation was accomplished using an electrically heated flat bed press. The composite structure was heated at the molding temperature under contact pressure for 5 minutes and then under 350–400 p.s.i. for 15 minutes, and finally cooled under pressure. The molding temperature for the composites containing the mixtures of Examples 5 and 6 was 550° F. and 500° F. for the control. The so molded composite laminates were tested for flexural properties. Results are summarized below.

| Flexural Properties | Example No. | | |
|---|---|---|---|
| | 15 | 16 | Control II |
| | Composite of Glass Fiber Swirl Mat and Mixture of— | | |
| | Example 5 | Example 6 | Control I |
| Strength at 70° F., p.s.i. | 52,200 | 55,500 | 52,000 |
| Modulus at 70° F., p.s.i. | 2,070,000 | 2,170,000 | 1,900,000 |
| Strength at 200° F., p.s.i. | 29,200 | 22,600 | 6,900 |
| Modulus at 200° F., p.s.i. | 1,450,000 | 1,290,000 | |
| Strength at 260° F., p.s.i. | 7,300 | 2,800 | 1,400 |
| Modulus at 260° F., p.s.i. | 500,000 | 170,000 | |

These examples demonstrate the excellent adhesion characteristics of the mixtures of this invention. Further, they demonstrate that composite, reinforced, post-formable sheets can be prepared utilizing the mixtures of this invention which will retain its flexural properties at temperatures of up to 260° F. On the other hand, Control II, containing unmodified polyhydroxyether, cannot be exposed to temperatures higher than about 200° F.

EXAMPLES 17–20

These examples demonstrate the improvement in thermal stress embrittlement gained by incorporating relatively small amounts of polyhydroxyether into a polyarylene polyether. Various amounts of polyhydroxyether prepared as in Example 2 and having a melt flow of 7.8 were admixed with polyarylene polyether prepared as in Example 1 and having an RV of 0.52. The polyarylene polyether in the form of pellets was dried overnight in a 130–140° C. oven under 28 inches Hg vacuum. The polymer was fluxed on an oil heated, two-roll mill (oil temperature, 540–570° F.) and the desired amount of polyhydroxyether added slowly. The milled mixture was compression molded into 15–30 mil sheets measuring 6" x 6" at 480–580° F. under 1000 p.s.i. Micro-tensile "dog-bone" samples were die cut from each sheet and grommets inserted in each end. The samples were stressed for 30 minutes at 125° C. under a 2000 p.s.i. load and then tested for tensile properties with an Instron tester. Data and results are summarized in the table below. In the table, an improvement in thermal stress embrittlement is indicated by an increase in elongation after yield.

| Example No. | 17 | 18 | 19 | 20 | Control III [1] | Control IV |
|---|---|---|---|---|---|---|
| Parts Polyhydroxyether | 1 | 3 | 5 | 10 | 100 | |
| Parts Polyarylene Polyether | 99 | 97 | 95 | 90 | | 100 |
| Tensile Strength, p.s.i.: | | | | | | |
| At yield | 11,200 | 11,200 | 11,500 | | 8,100 | |
| At failure | 9,100 | 10,100 | 8,500 | 10,000 | | 8,500 |
| Percent Elongation after Yield | 14 | 5 | 14 | 5 | [2] B | B |

[1] Stressed at 75° C. for 30 minutes under 2,000 p.s.i. load.
[2] Brittle Failure, no yield.

The results obtained in these examples were unexpected. It was quite surprising to discover that the incorporation of polyhydroxyether, which itself has poor resistance to thermal stress embrittlement (Control III), into a polyarylene polyether, which also has poor resistance to thermal stress embrittlement (Control IV), actually results in a marked improvement in this resistance of the latter.

EXAMPLE 21

Thermoplastic polyarylene polyether having the formula

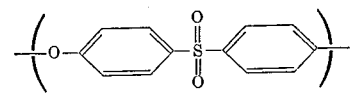

is prepared from 4,4'-dihydroxydiphenylsulfone and 4,4'-dichlorodiphenylsulfone according to the procedure of Example 1. A mixture containing 98 parts of this polymer and 2 parts of polyhydroxyether prepared as in Example 2 is prepared and is molded into tensile samples and tested as in Examples 17–20. The mixture exhibits an improvement in thermal stress embrittlement as compared to the Control IV.

EXAMPLE 22

Thermoplastic polyarylene polyether having the formula

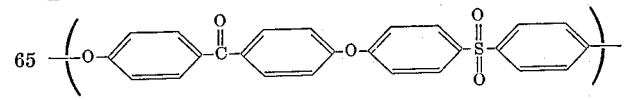

is prepared from the bisphenol of benzophenone and 4,4'-dichlorodiphenylsulfone according to the procedure in Example 1. A mixture containing 95 parts of this polymer and 5 parts of polyhydroxyether prepared as in Example 2 is prepared and is molded into tensile samples and tested as in Examples 17–20. The mixture exhibits an improvement in thermal stress embrittlement as compared to Control IV.

EXAMPLE 23

Thermoplastic polyarylene polyether having the formula

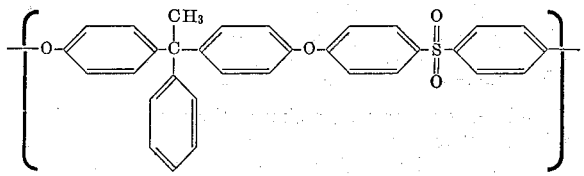

is prepared from the bisphenol of acetophenone and 4,4'-dichlorodiphenylsulfone according to the procedure of Example 1. A mixture containing 85 parts of this polymer and 15 parts of polyhydroxyether prepared as in Example 2 is prepared and is molded into tensile samples and tested as in Examples 17–20. The mixture exhibits an improvement in thermal stress embrittlement as compared to Control IV.

EXAMPLE 24

Thermoplastic polyarylene polyether having the formula

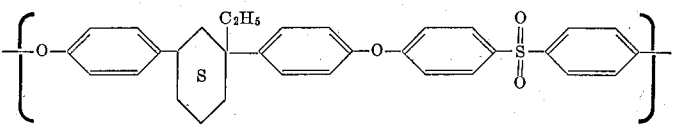

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure of Example 1. A mixture containing 80 parts of this polymer and 20 parts of polyhydroxyether prepared as in Example 2 is prepared and is molded into tensile samples and tested as in Examples 17–20. The mixture exhibits an improvement in thermal stress embrittlement as compared to Control IV.

EXAMPLE 25

Thermoplastic polyarylene polyether having the formula

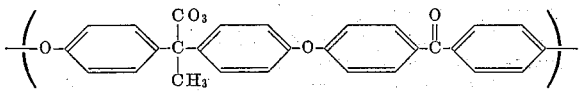

is prepared from 2,2'-bis-(4-hydroxyphenyl)propane and 4,4'-difluorobenzophenone according to the procedure of Example 1. A mixture containing 90 parts of this polymer and 10 parts of polyhydroxyether prepared as in Example 2 is prepared and is molded into tensile samples and tested as in Examples 17–20. The mixture exhibits an improvement in thermal stress embrittlement as compared to the Control IV.

EXAMPLE 26

Thermoplastic polyarylene polyether having the formula

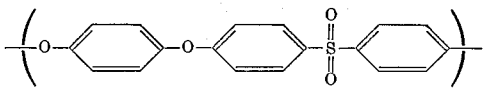

is prepared from hydroquinone and 4,4'-dichlorodiphenylsulfone according to the procedure of Example 1. A mixture containing 97 parts of this polymer and 3 parts of polyhydrxoyether prepared as in Example 2 is prepared and is molded into tensile samples and tested as in Examples 17–20. The mixture exhibits an improvement in thermal stress embrittlement as compared to Control IV.

EXAMPLE 27

Thermoplastic polyarylene polyether having the formula

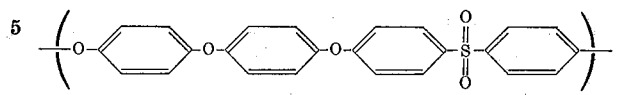

is prepared from 4,4'-dihydroxydiphenyl ether and 4,4'-dichlorodiphenylsulfone according to the procedure of Example 1. A mixture containing 85 parts of this polymer and 15 parts of polyhydroxyether prepared as in Example 2 is prepared and is molded into tensile samples and tested as in Examples 17–20. The mixture exhibits an improvement in thermal stress embrittlement as compared to Control IV.

EXAMPLE 28

These examples demonstrate the excellent adhesion properties of the mixtures of this invention. They also demonstrate that the adherent mixtures are stable in structural elements exposed to elevated temperatures. Chloroform solutions of polyhydroxyether prepared as in Example 2 and having a melt flow of 7.8 were combined with chloroform solutions of polyarylene polyether prepared as in Example 1 and having an RV of 0.49. The resulting solution was then coated onto 4″ x 1″ x 0.064″ thick aluminum strips. The strips were pretreated by dipping in an acid cleaning bath for 10 minutes at 140° F. The acid bath consisted of 44 parts by weight of potassium dichromate in 250 cc. concentrated sulfuric acid and 1800 cc. distilled water. The strips were rinsed in cold running water for 10 minutes, rinsed in distilled water and dried for 10 minutes at 212° F. Pairs of the pretreated, coated strips were overlapped one-half inch at their ends and bonded by placing the overlapped strips between the plates of a 7″ x 10″ jig. The jig was then placed between the platens of an electrically heated molding press heated to 600° F. The platens were closed and held at zero pressure for 2 minutes and a bonding pressure of 50 p.s.i. was applied at that temperature for a duration of 3 minutes. After cooling, three bonded strips were tested for lap shear strength according to ASTM D-1002 at room temperature (about 70° F.) and three at 250° F. The average lap shear strengths obtained are reported in the following table.

| Ratio of Polyarylene Polyether to Polyhydroxyether in Coating | Average Shear Strength, p.s.i. | |
|---|---|---|
| | Room Temperature | 250° F. |
| 1:1 | 3,070 | 493 |
| 3:1 | 3,360 | 943 |

We claim:
1. Polymeric mixture characterized by improved thermal stability, improved resistance to thermal stress embrittlement and excellent adhesion comprising from about 1 to about 99 parts by weight of a linear thermoplastic polyarylene polyether composed of recurring units having the formula

—O—E—O—E'— wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms and from about 99 to about 1 part by weight of a linear thermoplastic polyhydroxyether having the general formula

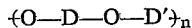

wherein D is the residuum of a dihydric phenol, D' is a hydroxyl containing residuum of an epoxide, and $n$ is at least 30.

2. Mixture defined in claim 1 wherein said polyarylene polyether is composed of recurring units having the formula

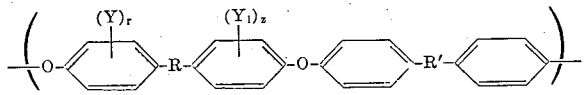

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

3. Mixture defined in claim 1 wherein said polyarylene polyether is composed of recurring units having the formula

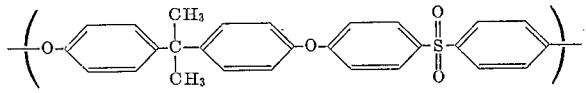

4. Mixture defined in claim 1 wherein said polyarylene polyether is composed of recurring units having the formula

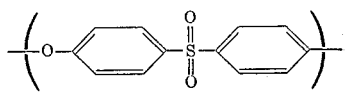

5. Mixture defined in claim 1 wherein $n$ is at least 80.

6. Mixture defined in claim 1 wherein said polyhydroxyether contains the residuum of a dihydroxydiphenyl alkane.

7. A structural element comprising an adherend and adhering thereto a mixture of from 1 to about 99 parts by weight of a linear thermoplastic polyarylene polyether composed of recurring units having the formula:

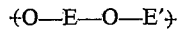

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms, and from about 99 to about 1 part by weight of a linear thermoplastic polyhydroxyether having the general formula

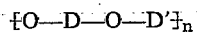

wherein D is the residuum of a dihydric phenol, D' is a hydroxyl containing residuum of an epoxide, and $n$ is at least 30.

8. A structural element comprising an adherend and adhering thereto a mixture of from about 1 to about 99 parts by weight of a linear thermoplastic polyarylene polyether composed of recurring units having the formula

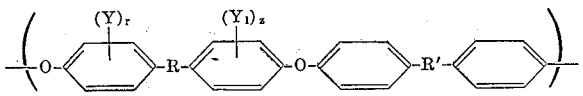

wherein R represents a member of the group consisting of a bond between aromatic carbon atoms, and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value of from 0 to 4 inclusive, and from about 99 to about 1 part by weight of a linear thermoplastic polyhydroxyether having the general formula

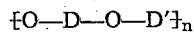

wherein D is the residuum of a dihydric phenol, D' is a hydroxyl containing residuum of an epoxide, and $n$ is at least 80.

9. Structural element of claim 8 wherein said thermoplastic polyarylene polyether is composed of recurring units having the formula

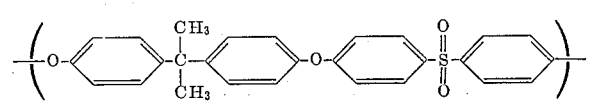

10. Structural element of claim 8 wherein said thermoplastic polyarylene polyether is composed of recurring units having the formula

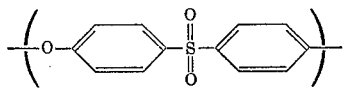

11. Structural element of claim 8 wherein said polyhydroxyether contains the residuum of a dihydricdiphenyl alkane.

12. Structural element of claim 7 wherein said adherend is a metal.

13. The structural element of claim 8 wherein said adherend is a vitreous material.

14. The structural element of claim 8 wherein said adherend is a polar material.

15. The structural element of claim 8 wherein said adherend is a polymeric material.

16. The structural element of claim 8 wherein said adherend is a cellulosic material.

17. The structural element of claim 8 wherein said adherend is a fibrous material.

References Cited

UNITED STATES PATENTS 3,332,909   7/1967   Farnham et al. _____ 260—47
3,238,087   3/1966   Norwalk et al. _____ 161—185

MURRAY TILLMAN, *Primary Examiner.*

M. J. TULLY, *Assistant Examiner.*